April 22, 1958 R. J. RICHARDS ET AL 2,831,326
VALVE
Filed April 6, 1956

INVENTORS
Robert J. Richards
Robert B. Jacobs
BY Arthur Vinograd
Leonard F. Stoll   ATTORNEY
AGENT

2,831,326
VALVE

Robert J. Richards, Denver, and Robert B. Jacobs, Boulder, Colo., assignors to the United States of America as represented by the Secretary of Commerce Application April 6, 1956, Serial No. 576,754

10 Claims. (Cl. 62—1)

This invention relates to valves which are particularly adaptable for use in the handling of cold fluid. In connection with cryogenics it is often necessary to employ mechanical apparatuses the functioning of which would offer no problem at conventional temperatures but the performance of which would be rendered useless at the extremely low temperatures involved in the handling of, for example, liquified gases. When temperature ranges down to 4° K. and below are involved it is apparent that heat leakage is a critical problem, the use of mechanical linkages to provide force transmitting means becomes provocative and the formation of gas or liquid leak-proof seals is extremely arduous from a mechanical standpoint.

The apparatus according to the present invention provides an effective valve for handling cold fluid such as liquified gases at extremely low temperature levels by providing a valve mechanism which is constructed so as to provide an extremely poor heat conductive path between the cold fluid and the outside atmosphere.

It is accordingly one object of this invention to provide a valve for cold fluids the mechanism of which is completely enclosed by vacuum insulation and yet which is only slightly larger in diameter than the particular transfer line in which it is installed.

Another object of this invention is to provide a valve which obviates the use of heat conducting seals or packing such as are employed in prior art constructions.

It is a further object of this invention to provide a valve which provides a minimum of moving or operating parts so as to have a high service reliability at extremely low temperatures.

It is a still further object of this invention to provide a valve in which the valve seat assembly is so arranged that the valve unit can be installed at any location in a transfer line.

Other uses and advantages of the invention will become apparent upon reference to the specification and drawings.

In principle, heat leak due to metallic conduction through a valve operating mechanism can be made negligible. In reality, however, the practice of placing a low-conductance metallic path between a cold liquid and the warm environment is not a reliable way to reduce heat leakage. In known prior art mechanisms the cold liquid is allowed to flow towards the warm end of the low-conductance metallic path. A resultant action is that very large heat leaks are created which causes the sealing material conventionally employed in such types of valves to "freeze" thereby resulting in fluid leakage.

The valve according to the present invention, on the other hand, is operated by moving both the fluid line through which the cold fluid flows and the outside line axially by means of a screw actuated valve handle.

Referring to the drawings.

Figures 1, 2:
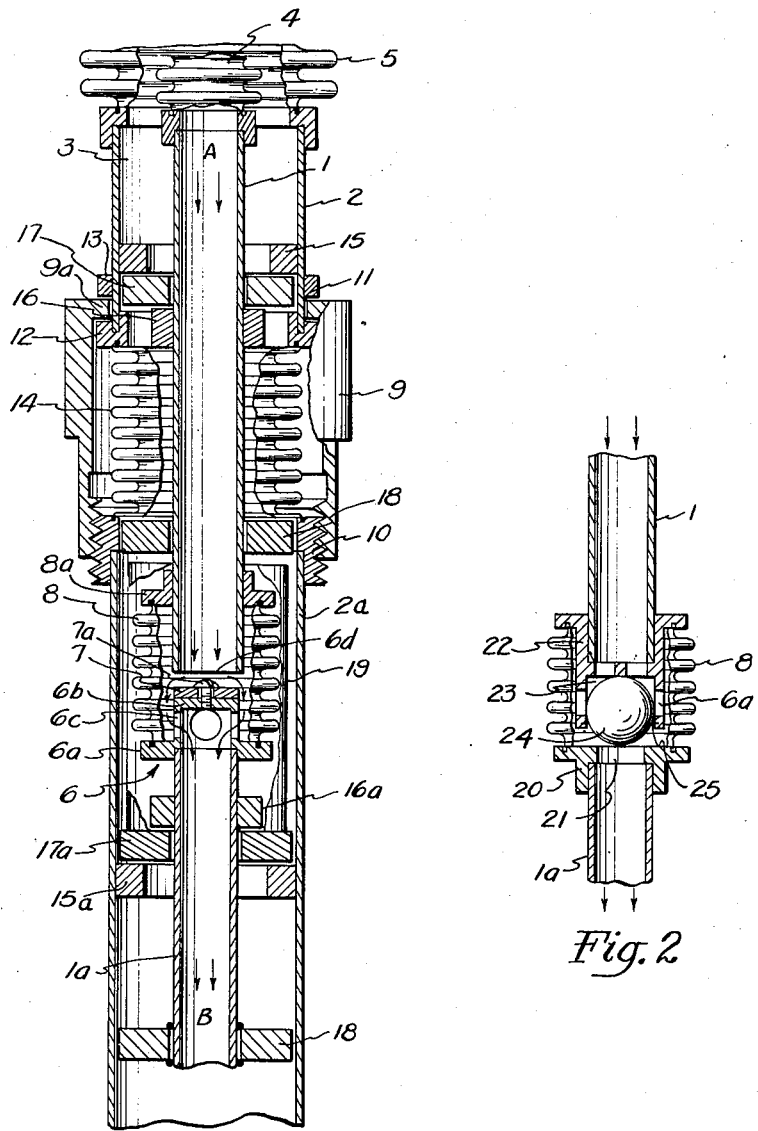
Fig. 1 shows the overall construction of the valve incorporating the features of the present invention.
Fig. 2 is an enlarged sectional view of a modified seat arrangement for the valve.

Fig. 1 shows the valve as a unitary assembly inserted in a fluid line through which cold fluid such as liquified gases are intended to flow from A to B. The member 1 or fluid conduit represents the inner line through which the cold fluid flows. According to conventional Dewar practice the fluid conducting line generally includes an outer jacket or shell 2 spacedly arranged concentrically with respect to the inner conduit 1 so as to provide highly evacuated annular heat insulating area 3 therebetween as indicated in Fig. 1. Both the inner conduit 1 and the outer shell 2 are connected to the remaining portion of the line (not shown) by means of an extensible coupling arrangement including a bellows 4 attached to the inner conduit 1 and a bellows 5 attached to the outer shell 2. In instances where the valve is connected to long lines sufficient flexibility is inherent in the line to obviate the need for the line-coupling bellows 4 and 5. By means of such flexible connection, it will be apparent that both the inner conduit 1 and the outer shell 2 can be longitudinally displaced relative to the main line as will be subsequently explained. As indicated, the inner conduit 1 is not continuous but includes a second section 1a which is spacedly arranged with respect to the upper section 1. The upper end of the lower conduit section 1a is terminated in a valve closure assembly 6 comprising a closure element 6b having a seal or washer 7 adapted to seat against and close the orifice 6d of the upper conduit section 1. The gasket or washer 7 which may preferably be made of Teflon or soft metal, such as annealed copper or soft aluminum, is fixed to the closure element 6b of the valve closure assembly by a suitable fastener 7a.

A number of peripherally arranged ports 6c are provided adjacent element 6b. The lower section 1a of the conduit is connected to the upper section 1 by means of an extensible, leak-proof bellows-like coupling 8 which permits longitudinal displacement between the two conduit sections. The coupling 8, as well as the previously described bellows 4 and 5 may be of any commercially available metallic type such as is manufactured by the Fulton-Sylphon Division of the R. S. Fulton Controls Company. The coupling 8 as is clearly shown in Fig. 1 is anchored to a flange 6a secured to the lower conduit section 1a at one termination and is secured to a flange 8a suitably fastened to or otherwise integrally formed with the lower end of upper conduit section 1. It will be apparent from such arrangement that the bellows 8 forms a leak-proof extensible jacket surrounding the juxtaposed ends of the conduit sections 1 and 1a and permits substantial longitudinal movement therebetween without destroying the high vacuum between the outer shell and inner conduit forming the cold-fluid line. Moreover, the inherent resiliency of the bellows employed provides a spring force which is utilized in opening the valve as will be described.

The lower end of the upper conduit 1 is suitably machined to form a square-end surface adapted to snugly seat against the gasket 7 when the two conduits are pressed together as will be subsequently described. As is apparent from Fig. 1, the orifice 6d, the closure elements 6b, 7 and the ports 6c are all located within the extent of the extensible coupling 8 and the fluid is therefore always effectively restricted within the confines of such leak-proof coupling.

The operating mechanism for the valve comprises a valve operating member 9 which threadingly engages a nipple 10 secured to the upper end of the outer shell 2 as clearly indicated in Fig. 1. The valve-operating member 9 is provided with an annular rim 9a which is adapted to engage an annular groove 11 suitably provided in the upper section of the outer casing 2. As indicated in the drawings the groove 11 is formed by the space between a pair of flanges 12 and 13 secured to the outer casing 2. The lower one of said flanges 12 provides a seat for another extensible connector in the form of a bellows 14 forming a leak-proof enclosure for the portion of the apparatus between the nipple 10 and flange 12. The bellows 14 is similar in construction to the previously identified bellows 4, 5, and 8. A force-transmitting ring 15 is securely fastened to the inner periphery of the outer shell 2 as shown in Fig. 1, while a second force-transmitting ring 16 is securely fastened to the upper portion of the conduit 1 in spaced relation to the aforementioned force-transmitting ring 15. Contact between the two force-transmitting rings 15 and 16 is obtained by means of an interposer 17 which is normally loosely and impositively retained in the area defined between the force-transmitting rings 15 and 16. The force-transmitting rings are made of a suitable metallic material such as brass while the interposer 17 may be in the form of a ring made of Teflon or a substance such as phenolic—impregnated linen, which has a low thermal conductivity.

It will be noted from Fig. 1 that in the "valve open" position the force transmitting rings 15, 16 and the interposer element 17 are very loosely arranged with respect to each other. That is, there is very little positive contact between the force-transmitting ring 15, the interposer 17, and the second force-transmitting ring 16. Accordingly there is a corresponding absence of any good heat conductive path between the inner conduit 1 and the outer shell 2.

Adjacent the lower section 1a of the conduit there is similarly arranged a force-transmitting ring 15a rigidly secured to the outer shell 2a, an inner force-transmitting ring 16a rigidly secured to the inner conduit section 1a, and a corresponding interposer element 17a, all constructed and arranged in a manner similar to that described above. Fig. 1 also shows a plurality of plastic spacers 18 normally employed for centering the inner conduit concentrically with the outer casing. The spacers generally provided in rigid transfer lines are adequate to insure alignment of the valve assembly. When the valve is applied to a flexible line it is preferable to provide a spacer adjacent the valve nipple 10 as shown in Fig. 1 for proper alignment of the valve. Where desirable, a radiation reflector 19 may be inserted within the casing 2 surrounding the bellows 8. The radiation reflector comprises a cylinder made of thin, bright-finished aluminum or other suitable reflective material.

In operation, cold fluid entering the valve in the region A will flow in the direction indicated by the arrows down through the lower end of the upper portion 1 of the conduit through the orifice 6d in conduit section 1 to the annular area defined by the bellows 8 and into the referred-to peripheral ports 6c to the lower conduit section 1a. In order to close the valve, the operating member 9 is turned, thereby projecting the upper and lower conduit sections 1 and 1a into engagement. In this manner, the lower end of section 1 of the conduit is forced into intimate contact with the seal 7. It will be apparent that the flexible upper connecting members 4 and 5 provide sufficient displacement for such movement of the transfer line section 1a without in any way interfering with the leak-proof integrity of the inner conduit sections 1, 1a.

In producing such downward displacement of the portion 1 of the inner conduit, it will be apparent from Fig. 1 that the motion of the valve-operating member 9 is transmitted through the collars 12 and 13 to the outer shell 1. Since the force transmitting ring 15 is formed integrally with the outer shell 2, the thrust will in turn be transmitted through the interposer element 17 to the other force-transmitting ring 16 secured to the referred-to conduit section 1. In other words, it will be noted from Fig. 1 and the above-described construction, that when the valve is in the open position as shown in Fig. 1, the interposer 17 is loosely held and in fact substantially "floats" between the two force-transmitting rings 15 and 16 and only when the valve is closed in the above-described manner will there be positive intimate contact between such elements. Because of such action, the possibility of heat conduction between the inner conduit 1 and the outer shell 2 occasioned by the connections or conducting path formed between the force-transmitting rings 15 and 16, and the interposer 17 exists only when the valve is closed, a condition which obviously obviates the need for a near-perfect heat insulation. That is, the conduction path established by the referred-to contacting surfaces exists only when no fluid is being delivered as is the case when the valve is closed, and heat loss due to conduction is not critical. When the valve is in an open position (as shown in Fig. 1) the loose, impositive connection between the force-transmitting members 15, 16, and 17 minimizes heat loss due to conductive effects when cold fluids are being delivered.

It will be noted from Fig. 1 that the corresponding force-transmitting rings 15a, 16a, and interposer 17a adjacent the lower section 1a of the inner conduit provide a mount for anchoring the rear section of the conduit within the shell 2 and for providing the same degree of heat conductivity control as is exemplified by the referred-to upper force-transmitting rings. That is, when the valve is in open position as indicated in Fig. 1, the lower force-transmitting ring 16a, 15a and interposer 17a will be loosely arranged with respect to each other and thereby provide a very poor heat conducting path when cold fluid is being transmitted through the inner conduit. Similarly in valve closed position, the reaction to the thrust supplied by the upper conduit against the lower conduit will result in engagement between the lower force-transmitting rings and interposer element only when the valve is closed and hence the possibility of heat conductivity exists only when no fluid is being transmitted. In order to open the valve, the operating member or handle 9 is rotated in a direction reversed to that described. As previously noted, the inherent resiliency of the extensible bellows employed provide a spring force which causes separation between the closure elements 6b, 7 and the orifice 6d. In addition, the fluid pressure tends to open the valve; by the use of two additional force-transmitting rings and interposers the valve may be positively opened.

Fig. 2 shows a modified form of the valve seating arrangement for the valve. In this embodiment the lower section 1a of the conduit is provided with a valve seat 20 having an opening 21 aligned with the inner diameter of the conduit. The upper, movable, section 1 of the conduit in this modification is provided with a sleeve 22 secured to the lower end of the conduit and having a chamber 23 defining a housing for a spherical closure element 24. The peripheral arranged valve ports 6a in this modification are provided in the member 22 instead of being on the lower section as in the modification of Fig. 1. A retaining ring 25 is provided to hold the ball valve in place. The resilient bellows 8 is fastened to a flange on the valve seat 20 and a flange on the member 22 respectively to define a leak-proof chamber surrounding the valve. In this modification the same force-transmitting ring and valve-operating mechanism described and shown in connection with Fig. 1 are employed. In the operation of the modification of Fig. 2, the fluid flows down through the upper conduit, around the ball valve, through the ports 6a, and down through the opening 21 to the lower section of the conduit 1a. In valve closed position the upper conduit section 1 forced downwardly by actuating the "valve handle," as previously described, causing the ball valve 24 to seat and seal off the opening 21.

It is apparent that the described principles underlying the present invention can be embodied in various forms other than that disclosed in the drawings and described above. For example, the flexible couplings such as 14 and 8 may take the form of any well-known leak-proof extensible connection, while various types of valve seating devices may be employed instead of the exemplary embodiments illustrated in the drawings. When the extensible connections employed do not possess sufficient resiliency, the spring action may be obtained by a supplementary spring as above described. It is therefore not intended to limit the invention other than as defined in the appended claims.

What is claimed is:

1. In a cold fluid transfer line having an external shell and an inner fluid conduit defining an intermediate high vacuum heat-insulating area therebetween, a valve comprising: a plurality of external shell and internal fluid conduit sections individually secured to said external and inner conduit portions of said line respectively, adjustable means coupling the external shell sections to provide relative displacement therebetween, and forming a vacuum-tight boundary contiguous with said external shell, motion transmitting means normally loosely coupling said external shell sections to said internal conduit sections, closure means on at least one of said conduit sections, means for actuating said closure means upon displacement of said fluid conduit sections relative to each other by actuation of said adjustable means, and means defining a leak-proof passage between said conduit sections.

2. The invention of claim 1 in which said leak-proof passage defining means comprises an extensible resilient coupling secured respectively to adjacent ends of said conduit sections.

3. The invention of claim 2 in which one of said conduit-section ends is provided with peripheral ports located within the extent of said extensible coupling.

4. The invention of claim 3 in which said closure means comprises a closure element secured to one of said adjacent conduit-section ends within the extent of said extensible coupling and adapted to seat against and seal the other of said adjacent conduit-section ends.

5. The invention of claim 4 in which said closure element comprises a closed end of one of said conduit sections.

6. The invention of claim 4 in which said closure element comprises a plug secured to the ported conduit end section.

7. The invention as defined in claim 1 in which said motion-transmitting means comprises force-transmitting rings secured to said external shell sections, force-transmitting rings secured to said fluid conduit sections in normally spaced relation to said first-mentioned force-transmitting rings and an interponent normally loosely disposed in the space defined between adjacent shell and conduit-section force-transmitting rings and adapted to be engaged by said rings upon actuation of said adjustable means.

8. The invention of claim 7 in which said adjustable means comprises an operating handle operatively engaging said outer shell sections and in which a leak-proof flexible seal joins said outer shell sections.

9. The invention of claim 7 including an extensible leak-proof coupling joining said external shell sections and in which said adjustable means comprises a sleeve surrounding said leak-proof coupling and operatively connected to each shell section.

10. The invention of claim 7 including extensible coupling means for connecting said shell and conduit sections to said transfer line.

References Cited in the file of this patent

UNITED STATES PATENTS

| | | |
|---|---|---|
| 2,042,523 | Graham | June 2, 1936 |
| 2,302,089 | Aller | Nov. 17, 1942 |
| 2,559,116 | Doschek | July 3, 1951 |
| 2,708,563 | Backman | May 17, 1955 |